United States Patent [19]

Schultz

[11] Patent Number: 4,765,086
[45] Date of Patent: Aug. 23, 1988

[54] FISHING LURE

[76] Inventor: James Schultz, P.O. Box 17177, Fountain Hills, Ariz. 85268

[21] Appl. No.: 107,658

[22] Filed: Oct. 9, 1987

Related U.S. Application Data

[63] Continuation-in-part of Ser. No. 907,233, Sep. 15, 1986, abandoned.

[51] Int. Cl.⁴ ............................................. A01K 85/00
[52] U.S. Cl. .................................................. 43/42.52
[58] Field of Search ................... 43/42.52, 43.16, 43.2, 43/44.4, 44.2, 44.6, 44.8

[56] References Cited

U.S. PATENT DOCUMENTS

| | | | |
|---|---|---|---|
| 1,466,231 | 8/1923 | Johnson | 43/42.52 |
| 1,888,641 | 11/1932 | Toepper | 43/42.52 |
| 1,890,400 | 12/1932 | Miller | 43/42.52 |
| 2,167,163 | 7/1939 | Toepper | 43/42.52 |
| 2,319,686 | 5/1943 | Janisch | 43/42.52 |

Primary Examiner—M. Jordan
Attorney, Agent, or Firm—Gregory J. Nelson

[57] ABSTRACT

An artificial fishing lure having a spoon-shaped body which supports a hook. A v-shaped weed guard of spring steel wire extends rearwardly terminating proximate the barb on the hook. The forward end of the weed guard legs are connected and form a loop for attachment of a fishing line. A holder for a plastic worm may be detachably secured to the spoon hook. In one embodiment, the worm holder has a spiral configuration.

9 Claims, 1 Drawing Sheet

U.S. Patent
Aug. 23, 1988
4,765,086
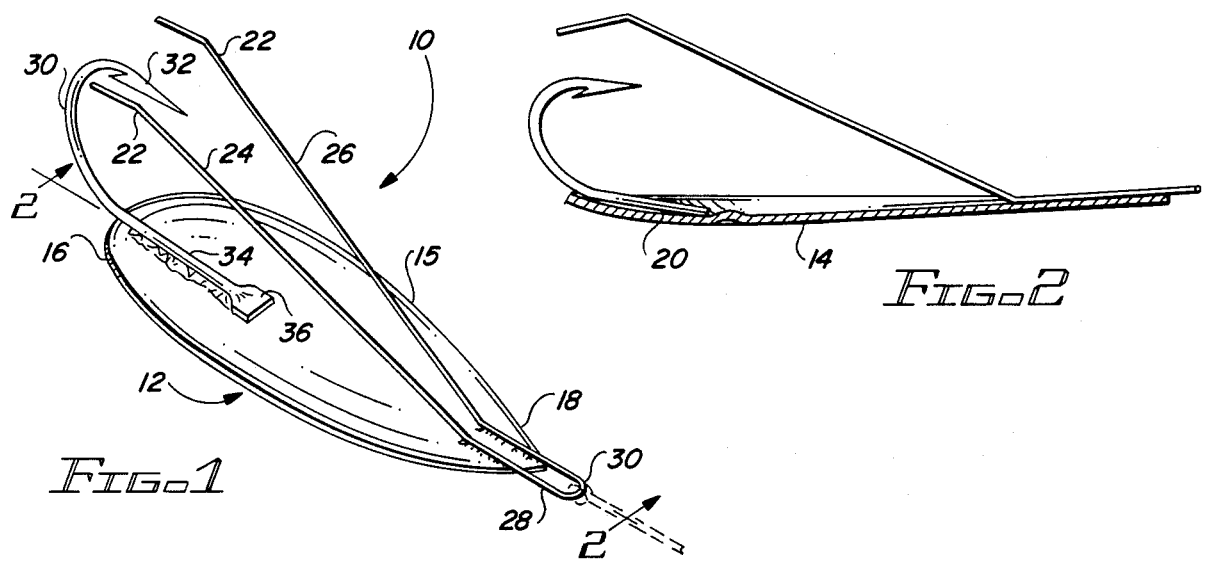
FIG-1
FIG-2
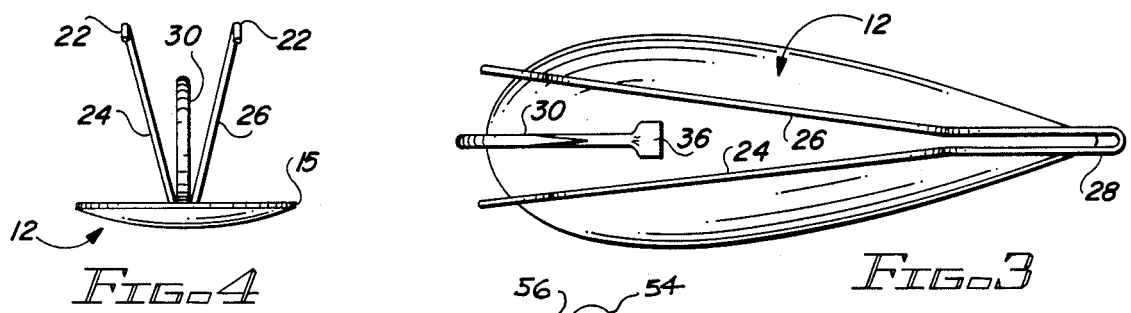
FIG-4
FIG-3
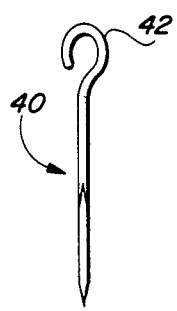
FIG-5
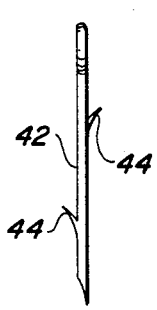
FIG-6
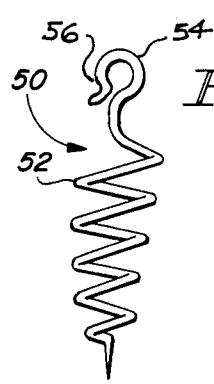
FIG-6A
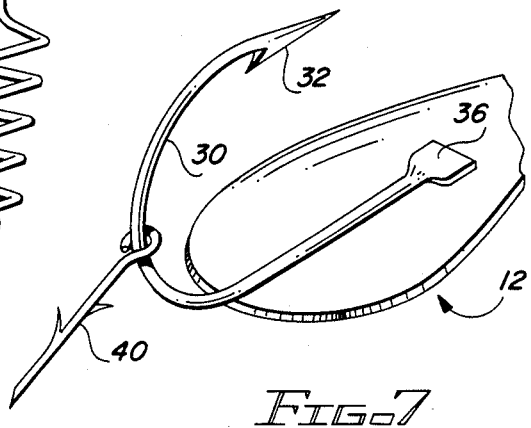
FIG-7
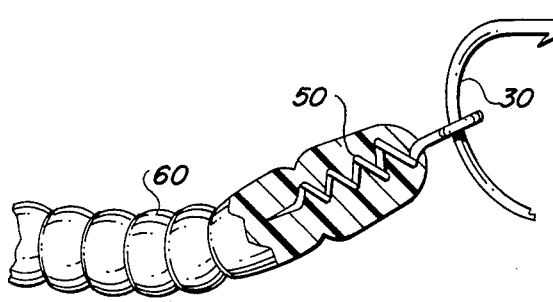
FIG-8
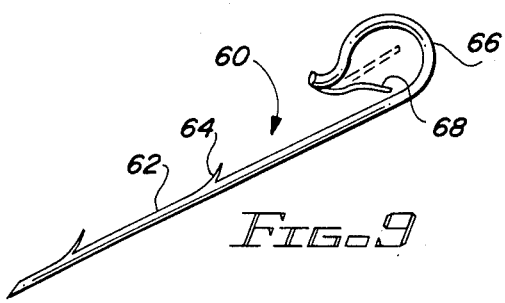
FIG-9

1

FISHING LURE

The present application is a continuation-in-part of application Ser. No. 06/907,233, filed Sept. 15, 1986, abandoned Oct. 14, 1987 entitled FISHING LURE.

The present invention relates to a fishing lure and more particularly to a lure of the type generally in the form of a spoon having a hook and weed guard secured thereto.

BACKGROUND

Artificial fishing lures of various types are well known in the art. A common type of fishing lure employs a spoon-like body to which is secured a hook. Lures of this type generally incorporate one or more projections forward of the hook to prevent the hook from entangling in submerged plant life. These projections are generally termed "weed guards".

Spoon-shaped lures are attached to the fishing line and pulled through the water with the spoon assuming a generally horizontal position in the water. The spoon is fabricated of a highly polished metal or is brightly painted to attract fish. The spoon should have a shape which imparts a wobbling movement about the longitudinal axis. Further, the spoon shape is generally designed to insure that the spoon will not tend to rise to the surface at higher trolling speeds. In some instances, an additional fish attractant in the form of a plastic worm may be secured to the hook of the spoon to serve as an additional lure to fish.

Various spoons of this general type may be found in the prior art. The early patent to Pflueger, U.S. Pat. No. 1,992,766, shows a lure of this general type which discloses an improved means for attaching or securing a hook to the frame or body of the spoon. Topper, U.S. Pat. No. 2,167,163, shows a spoon configuration having a forwardly inclined nose portion that has a concave upper surface for maintaining the spoon at a substantially uniform depth below the surface. U.S. Pat. No. 2,619,764 to Mellin shows an improved means of detachably securing the hook to the body of the spoon. Other relevant patents include U.S. Pat. Nos. 2,519,338; 2,567,813; 2,895,252; 2,989,816; and 377,033.

While the foregoing patents represent various improvements to artificial fishing lures, these improvements often result in a lure which is not economical to manufacture or which assumes a motion which is not attractive to fish. The present invention provides a new form of artificial fishing lure which is attractive to fish and which is simple and economical to manufacture. The lure of the present invention also is configured to minimize the possibility of entanglement is submerged plant life.

SUMMARY OF THE INVENTION

Accordingly, it is a primary object of the present invention to provide a fishing lure which has an effective action in the water to attract fish. Further, the lure of the present invention provides an improved means of attaching or securing the hook in place so that it is firmly and efficiently anchored to the spoon. It is another object of the present invention to provide a detachable plastic worm holder which can be easily and conveniently secured to the hook of the lure.

Briefly, the present invention comprehends an improved fishing lure having a spoon-shaped body with a concave upper surface and convex lower surface. A hook is secured to the upper surface of the spoon at the rear of the spoon and has a downwardly turned point. The shank of the hook is preferably enlarged at a flattened end portion to provide additional surface for easy and secure placement of the hook. A weed guard member has a pair of legs that project upwardly and rearwardly at least to the barb of the hook. The forward end of the weed guard is formed as a U-shaped member integral with the legs. The U-shaped member projects forwardly of the front edge of the spoon to provide a point of attachment for the fishing line. An auxilliary worm hook may be detachably secured to the hook of the lure. In the preferred embodiment, the worm hook has a generally spiral configuration.

BRIEF DESCRIPTION OF THE DRAWINGS

The above and other objects and advantages of the present invention will be more specifically described and pointed out below. Reference is made to the drawings in which:

FIG. 1 is a perspective view of the improved fishing lure of the present invention;

FIG. 2 is a sectional view taken along lines 2—2 of FIG. 1;

FIG. 3 is a plan view of the lure shown in FIG. 1;

FIG. 4 is a front view thereof;

FIG. 5 is a plan view of a worm attachment to be used with the lure of the present invention;

FIG. 6 is a side elevational view of the worm attachment shown in FIG. 5;

FIG. 6A is a plan view of an alternate form of the worm attachment;

FIG. 7 is a perspective view illustrating a part of the lure with the worm attachment of FIGS. 5 and 6 being secured thereto:

FIG. 8 is a detail view showing a portion of the lure hook and plastic worm secured thereto by means of the worm attachment shown in FIG. 6A; and FIG. 9 is a plan view of an alternate form of the worm attachment means.

DESCRIPTION OF THE PREFERRED EMBODIMENT

The fishing lure of the present invention is best seen in FIGS. 1 to 3 and is generally designated by the numeral 10. The lure includes a body generally designated by the numeral 12 which is preferably formed of a corrosion-resistant metal such as stainless steel polished to a high lustre, or alternatively, provided with a high visibility coating. The body 12 has opposite generally arcuate sides 15 and 16 converging in a rear or tail portion at the rear end of the spoon. Opposite sides 15 and 16 converge at front or nose portion 18. As best seen in FIG. 3, the overall configuration of the spoon is a general tear-drop shape. The upper surface of the spoon is generally convex while the lower opposite surface is generally concave. This configuration provides a desirable "action" in the water and imparts a movement which tends to attract fish. This configuration also provides stability preventing the spoon from turning over in the water in an unnatural action.

A hook 30 is secured to the upper surface of the spoon. The hook 30 has a longitudinally extending shank portion 34 terminating at a flattened or enlarged end 36. The opposite end of the hook 30 terminates at a point 32. The upper distal surface of the hook 37 from the bend of the hook to the point 32 is slightly inclined or curved downwardly to minimize fouling in weeds and plant life. A barb 39 is provided rearward of the point 32. The shank 34 is secured along the longitudinal axis of the spoon by application of solder or other adhesive material. The enlarged flattened portion 36 provides a substantial surface for securing the hook to the spoon and facilitates securing the hook in a plane generally perpendicular to a plane through opposite sides 15 and 16.

As best seen in FIG. 2, it is preferred that the spoon 12 be provided with a slight longitudinally extending depression 20 to receive the shank 34 of the hook which depression will further facilitate proper assembly of the spoon and alignment of the hook with respect to the spoon.

A light, flexible weed guard 26 is secured to the upper surface of the spoon consisting of rearwardly and upwardly extending legs 24 and 26 oriented in a general V-configuration with respect to one another. The legs 24, 26 terminate along the opposite sides of hook barb 32 in a generally horizontal section 25 with the end sections 25 of the legs at or rearward of barb 39. The purpose of the weed guard is to deflect debris and submerged plant life so that the hook 30 does not become entangled when in use. The weed guard protects the hook from entanglement with weeds in front of and at the side of the barb.

The forward end of legs 24, 26 are joined by a generally U-shaped loop 28. Loop 28 is secured to the upper surface of the spoon in the approximate front one-third of the spoon. The weed guard may be secured by soldering or by application of other appropriate adhesive. A portion of the loop 28 extends forwardly of the front end of the spoon to provide an eye 30 for attachment of a fishing line as shown in dotted. Thus, with this construction, the weed guard serves a purpose of both protecting the hook and providing a point of attachment for the fishing line making the manufacture of the lure simple and inexpensive. The integral loop which projects forwardly from the edge of the spoon body does not interfere with the proper "action" of the lure in the water. Preferably the weed guard is to be constructed from a flexible stainless steel wire.

In use, the fishing line is attached in conventional manner to loop 28 and the lure is drawn through the water to attract fish. As pointed out above, the body of spoon portion will be of a high lustre or bright color to serve to attract fish. The weed guard legs 24 and 26 extending along either side of the hook to at least the barb serve to deflect plant life to prevent entanglement with such submerged structures. The downwardly turning distal portion of the hook also tends to deflect weeds and plant life.

In some instances, it is desirable to attach a highly visible plastic worm to the lure. This is generally done by securing a separate worm holder to the hook 30. One such form of worm holder is shown in FIGS. 5 and 6. In this embodiment, the worm holder is generally designated by the numeral 40 and includes an elongate shank terminating at a point at one end and having an eye or loop 42 at the opposite end. The eye or loop 42 is securable about the hook 30 as shown in FIG. 7. Barbs 44 along the shank serve to retain the plastic worm when the shank of the worm holder is inserted into the plastic worm.

FIG. 6A shows an alternate form of worm holder generally designated by the numeral 50. In this embodiment, the shank of the worm holder is configured in general spiral or "corkscrew" configuration terminating at a point. The opposite end is again provided with a loop or eye 54 which is securable about the hook 30 as shown in FIG. 8. The eye 54 has a terminal portion 56 which is preferably deflectable under application of pressure to allow the eye 54 to be slipped about the diameter of the hook 30. The retaining terminal portion 56 prevents accidental dislodgement of the worm holder and attached worm from the hook 30. The spiral configuration permits the user to securely "screw" the holder 50 into the pliable plastic worm to secure the worm 60.

FIG. 9 shows a somewhat similar worm attachment generally designated by the numeral 60. Again, the worm holder has an elongate shank 62 provided with a plurality of barbs 64. The head 66 which is securable about hook 30 has an inwardly extending detent 68 of a flexible material secured at one end to the terminal portion of the head 66. As indicated in dotted lines in FIG. 9, the detent will deflect inwardly to facilitate securement of the worm attachment 60 to the hook 30. After attachment, the detent 68 will assume the position shown in FIG. 9 to prevent dislodgement of the worm attachment from the hook.

From the foregoing, it will be seen that the present invention provides a new and novel fishing lure which will have an effective action to attract fish. Further, the configuration of the lure lends itself particularly to efficient manufacture in that orientation of the hook relative to the spoon is insured through the hook and spoon configuration. Further, having the line attachment eye integral with the weed guard eliminates manufacturing steps while yet providing a highly effective lure. The various worm holder attachments that may be used with the lure of the present invention provide greater flexibility and adaptability to the water.

It will be obvious to those skilled in the art to make various modifications, alterations and changes to the lure described herein. To the extent that these variations, alterations and modifications do not depart from the spirit and scope of the appended claims, they are intended to be encompassed therein.

I claim:

1. An artificial fishing lure for attachment to a line comprising:
   (a) a body having oppositely curved edges, said edges converging at a forward and rear end in a general spoon shape, said body having a generally concave top surface and a convex bottom surface and being substantially smooth on both said top and bottom surfaces and said body being free of apertures therethrough whereby said body will not tend to flop and will assume a generally horizontal position when drawn through the water;
   (b) a hook having a shank with a curved body portion at the rear of said shank terminating at a forward oriented point with a barb rear of the point, the shank of said hook being secured to the upper surface of said body along a generally longitudinal axis; and
   (c) a weed guard having a pair of legs disposed along opposite sides of the hook and extending rearwardly and upwardly to a location at least corresponding to said barb, said legs being joined at their forward ends at a loop, said loop being secured to the upper surface of said body in the approximate front one-third of the body with a portion of the loop extending forward of the front side of the body to form a line attachment location generally co-planar with the surfaces of said body to which said loop is attached.

2. The fishing lure of claim 1 wherein said hook shank has an enlarged generally flat portion adapted to be secured to said body to facilitate alignment relative to the body.

3. The fishing lure of claim 1 further including a worm holder having a head adapted to be secured to said hook and a body terminating at a barb.

4. The fishing lure of claim 3 wherein said worm holder body has a plurality of barbs.

5. The fishing lure of claim 3 wherein said worm holder body is generally spiral shaped.

6. The fishing lure of claim 3 wherein said head is generally loop-shaped having retainer means for detachably securing said head to said hook.

7. The lure of claim 2 wherein the weed guard is spring steel.

8. The lure of claim 2 wherein said shank is received in a longitudinal groove in the body.

9. The lure of claim 1 wherein said hook is generally inclined upwardly from said point to a location corresponding to the said barb.

* * * * *